Dec. 20, 1960   E. R. HABERLAND   2,965,030
SELF-EXCITED CHOPPER FOR MINES AND TORPEDOES
Filed June 28, 1945   2 Sheets-Sheet 1
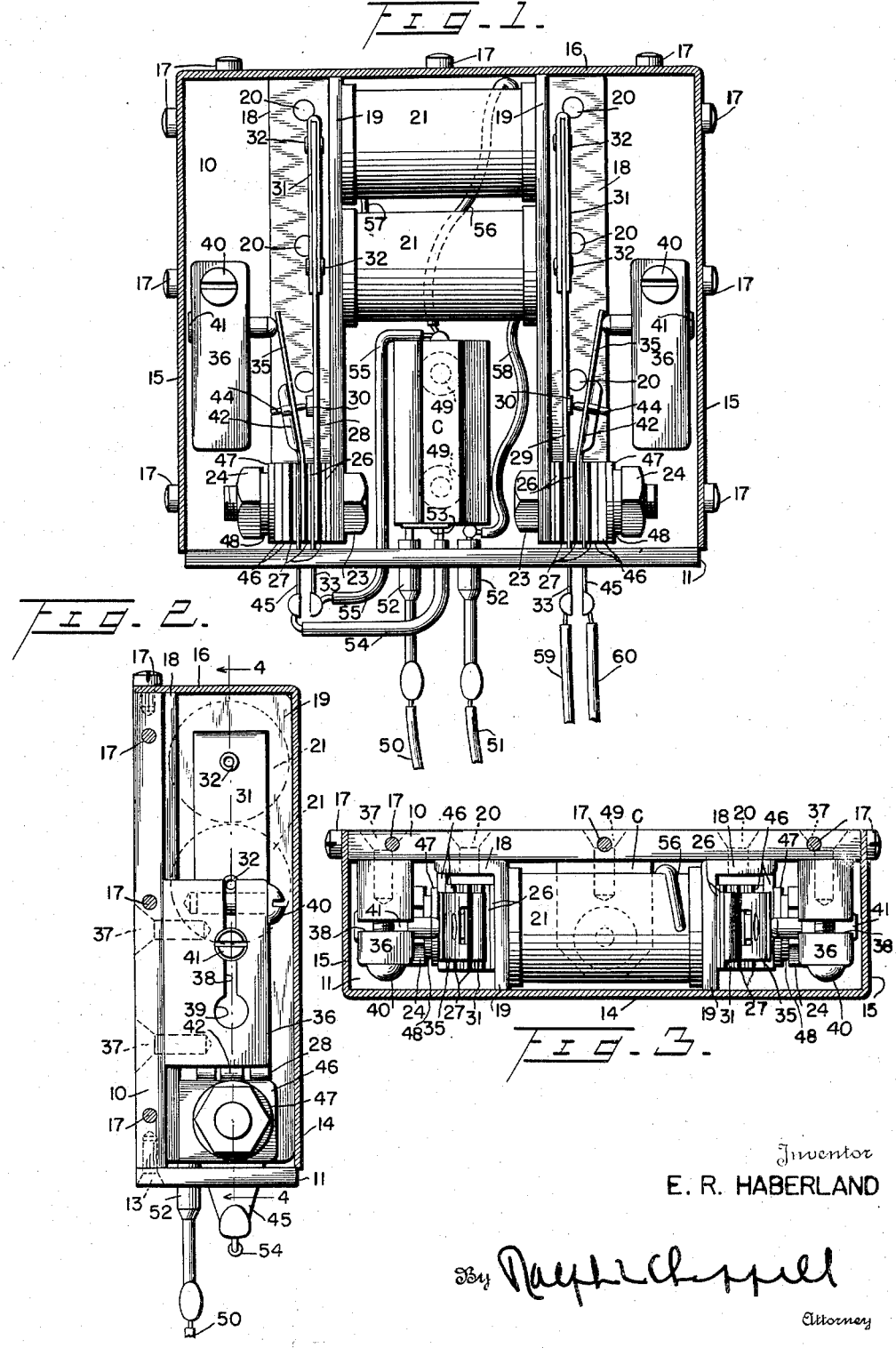
Inventor
E. R. HABERLAND Dec. 20, 1960 E. R. HABERLAND 2,965,030
SELF-EXCITED CHOPPER FOR MINES AND TORPEDOES
Filed June 28, 1945 2 Sheets-Sheet 2
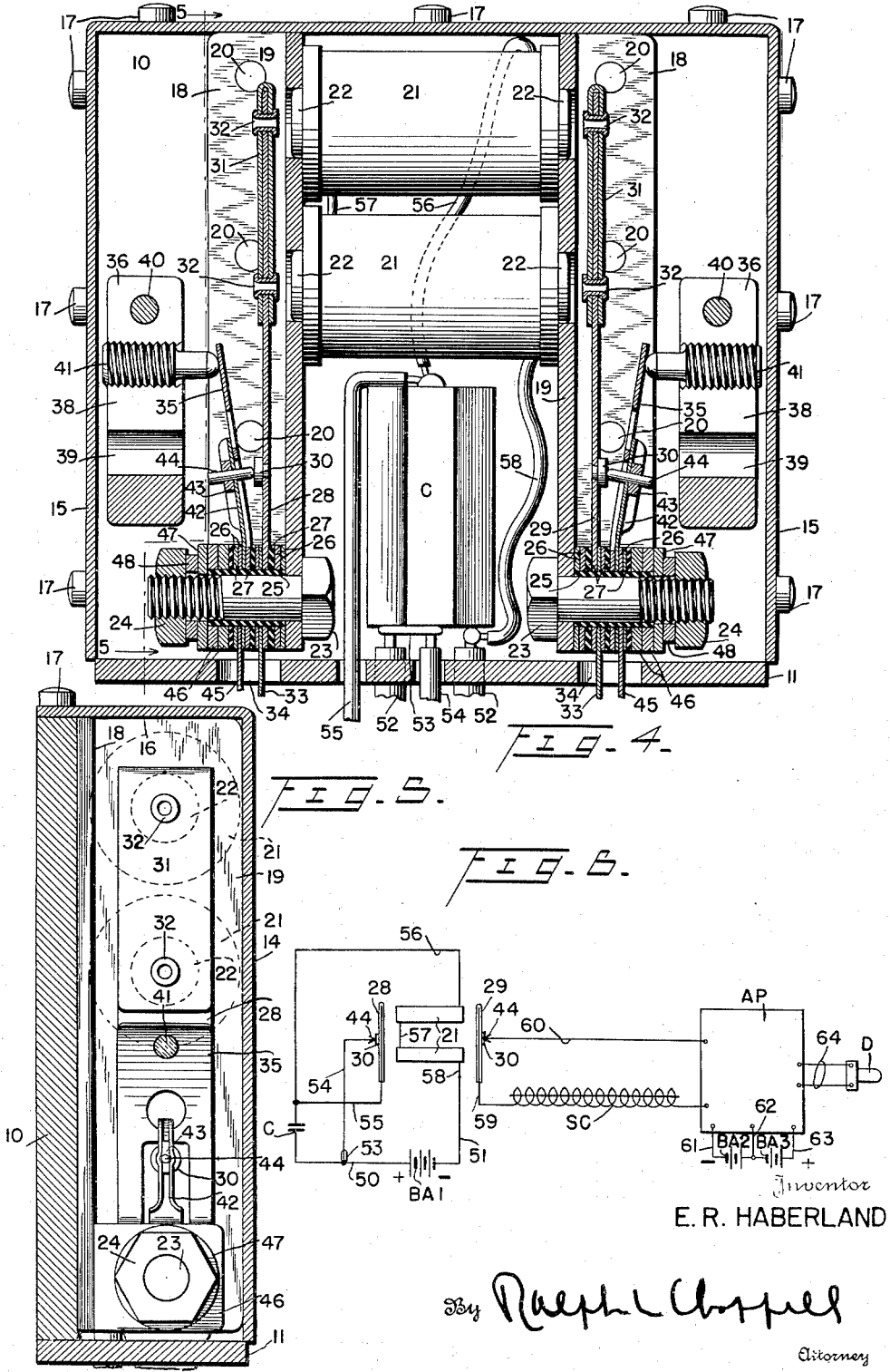

United States Patent Office 2,965,030
Patented Dec. 20, 1960

2,965,030

SELF-EXCITED CHOPPER FOR MINES AND TORPEDOES

Ernest R. Haberland, 3986 Pennsylvania Ave. SE., Washington, D.C.

Filed June 28, 1945, Ser. No. 602,145

6 Claims. (Cl. 102—18)

(Granted under Title 35, U.S. Code (1952), sec. 266)

This invention relates to an electrically operated self-excited chopper for use in influence type mines and torpedoes for converting the direct current received from an induction pickup or search coil in response to a changing magnetic field adjacent the device, into pulsations suitable for use with the firing control mechanism.

An object of the present invention is to provide a self-excited chopper which will be compact and operate on the direct current source usually available in an influence type mine or torpedo and which will consume only a small amount of electric power.

Another object of the invention is to provide a self-excited chopper which will combine the vibrator and chopper into a single unit in which the magnetic interference of the unit with the magnetic controlled detecting mechanism of the mine or torpedo is a minimum.

Another object of the present invention is to provide a self-excited chopper having a common magnetic circuit in which the driving element and the chopping element are controlled by separate magnetic armatures individual thereto.

A further object is to provide a self-excited chopper in which the electrostatic coupling between the driving contacts and the chopper circuit is a minimum.

Other objects, advantages, and improvements will be apparent from the following description taken in connection with the accompanying drawings, in which:

Fig. 1 is a plan view of the device showing the casing in section;

Fig. 2 is a side elevation view of the device of Fig. 1, the casing being shown in section;

Fig. 3 is a top plan view, partially in section, with the top plate of the casing removed;

Fig. 4 is a view similar to Fig. 1 but on an enlarged scale and taken substantially on the section line 4—4 of Fig. 2;

Fig. 5 is a section along the line 5—5 of Fig. 4; and,

Fig. 6 illustrates a circuit arrangement showing in diagrammatic form one of the many uses to which the device of the present invention is adapted.

Referring now to the drawings for a more complete understanding of the invention, and more particularly to Figs. 1 and 4 thereof, it will be seen that the various parts of the device are mounted on a back plate 10. As shown in Fig. 2, a bottom plate 11 is secured to the back plate 10 as by screws 13. A cover 14 having integral sides 15—15 and a top plate 16, both turned at right angles to the plane of the cover, is secured to the back plate 10 by additional screws 17; the bottom plate 11 on the back plate 10 and the cover 14 may be made of any paramagnetic material suitable for the purpose to provide for magnetic shielding. If, however, these elements are made of diamagnetic material, such, for example, as brass or the like, the entire device may be advantageously mounted within a magnetically shielded box.

A pair of angle bars having bottom flanges 18 and side flanges 19 are mounted on the back plate 10 in parallel relationship with the side edges thereof, as by screws 20 extending from the rear face of the back plate. These bars are made of some suitable diamagnetic material such as brass, for a purpose which will be more clearly apparent hereinafter. A pair of electromagnets 21—21 are mounted in parallel relationship between the side flanges 19 of the angle bars, these electromagnets having cores 22—22 which project into suitable holes in the side flanges 19.

Adjacent the bottoms of the angle bars, bolts 23—23 pass through suitable holes in the side flanges 19, these bolts having nuts 24—24 on their outer ends. The shanks of these bolts are encompassed by bushings 25—25 of insulating material. A pileup composed of metallic spacing washers, insulating washers, and conductor elements is assembled on each of these bolts. These pileups consist of two spacing washers 26—26, one abutting the side flanges 19 of the angle bars and the second abutting the first and next an insulating washer 27. The butt end of a driving vibrator 28 is passed over the left insulator bushing 25 and compressed against the insulating washer 27 on this bushing; similarly, the butt end of an output vibrator 29 is passed over the right insulator bushing 25 and compressed against the insulating washer 27 on this bushing. The vibrators 28 and 29 are made of any suitable metal having the requisite modulus of elasticity and electrical conductivity, for instance phosphor-bronze alloy. At about one-third of the length from the bottom there is positioned on each of the vibrators 28 and 29 a contact member 30. The contact members 30 are preferably formed as rivets of platinum-iridium alloy and secured in suitable holes in the vibrators 28 and 29 in the usual manner of riveted joints. Armatures 31—31 are preferably formed from strips of thin soft sheet iron folded back on themselves and are mounted on the upper ends of the vibrators 28 and 29, respectively. The upper ends of the vibrators are interposed between the folds of the armatures 31—31 and rivets 32 pass through the folds and the vibrators, these rivets being aligned with the cores 22—22 of the electromagnets 21—21 when the electromagnets and the vibrators are in assembled relationship. As previously stated, the angle bars 18—19 are made of some suitable diamagnetic material, such as brass, and the path of the magnetic flux outside the cores 22—22 of the electromagnets is principally through the armatures 31—31.

The pileups are continued by connector members 33—33, which are positioned on the insulator bushings 25—25 adjacent the butts of the vibrators 28 and 29. Spacing washers 26—26 and insulating washers 27—27 are placed seriatim on the bushings 25—25 outwardly of the bolts 23—23. The connector members 33—33 have integral connector lugs projecting downwardly from their lower faces, these lugs passing through holes 34 in the bottom plate 11.

Spring members 35—35 have their butts bifurcated and pass over the insulating bushings 25—25 in face-to-face relationship with the last described insulating washer 27. Immediately above the pileups the spring members 35—35 are bent slightly outwardly so that their upper ends are disposed at a greater distance from the side flanges 19 of the angle bars then their butts.

Stop members 36—36 are formed as rectangular blocks and secured to the back plate 10 by screws 37. Each of these stop members is formed with a longitudinal slot 38 which extends from the top for about three quarters of the length of the stop members and terminates in a transverse hole 39, the slot and the hole severing the upper part of the block from the lower for the three quarters portion of the length. The slot 38 and the hole 39 taken together are substantially of keyhole shape, and the center line of the slot and the hole is coincident with the center line of the cores 22—22 of the electromagnets 21—21, when the blocks are in assembled relationship. Near the upper end of each block, remote from the hole 39, a locking screw 40 passes freely through a suitable hole parallel to the face planes in the partially severed upper portion of the block and is received in a threaded continuation hole in the lower section of the block. Set screws 41—41 are provided in suitably threaded holes formed transversely of each of the blocks 36—36 slightly above the mid-sections thereof, the inner ends of each of these set screws being aligned with and abutted by the outer ends of the spring members 35—35, respectively.

Fixed contact members 42—42 are mounted around the insulator bushings 25—25 in the crotches of the bifurcated butts of the spring members 35—35. Immediately above the pileups the fixed contact members are bent outwardly at the same angle as the spring members 35—35 and abut these spring members throughout the lengths of the former. Also, immediately above the pileup, the edges of the fixed contact members are bent upwardly at right angles to their respective body sections. Midway of the bent-up side portions of the fixed contact members a block 43 is mounted on each fixed contact member, these blocks being engaged by the bent-up side portions and soldered to the latter. Contact rods 44—44 of platinum-iridium alloy are mounted in suitable holes in the blocks 43—43 and these contact rods are adapted to engage at their inner ends the movable contacts 30—30 carried by the vibrators 28 and 29, respectively, when the latter are in their outermost positions.

It will readily be seen that clockwise rotation (Fig. 4) of the set screws 41—41 in the blocks 36—36 will force the spring members 35—35 inwardly and that the fixed contact members 42—42 carrying the contact rods 44—44 will follow the spring members, thereby further limiting the arcs of oscillation of the vibrators 28 and 29; conversely, counter-clockwise rotation of the set screws 41—41 will allow the spring members 35—35 to move outwardly thereby forcing the fixed contact members 42—42 also outwardly and lengthening the arcs of oscillation of the vibrators 28 and 29. In either case the locking screws 40—40 are loosened before the set screws 41—41 are adjusted and tightened thereafter.

The pileups are further continued by additional connector members 45—45 which are positioned around the bushings 25—25 adjacent the butts of the fixed contact members 42—42, respectively, and spacing washers 26—26 and insulating washers 27—27 are placed seriatim on the insulating bushings 25—25 outwardly of the bolts 23—23. The connector members 45—45 have integral connector lugs projecting downwardly from their lower faces, these lugs also projecting through the holes 34 in the bottom plate 11.

Adjacent the last mentioned insulating washers 27—27 there are positioned on each bolt 23—23 a pair of spacer washers 46—46, these washers being also positioned over the insulator bushings 25—25. Next to the outermost spacer washer 46 there is positioned on each bolt 23—23 a third washer 47, these latter directly encompassing the bolts. A lock washer 48 and the nut 24 on each bolt complete the assembly of the pileups. By arranging the pileups on opposite sides of the side flanges 19—19 of the angle bars supporting the electromagnets 21—21, the angle bars are employed as an electrostatic shield to reduce the electrostatic coupling between the driving contacts and the chopper circuit including the chopper contacts.

A capacitor C is enclosed by a casing of any of the well known phenolic condensation products and is secured to the back plate 10 by screws 49 extending through the back plate, the capacitor being positioned in the space bounded by the side flanges 19—19 of the angle bars, the lower electromagnet 21, and the bottom plate 11. Two conductors, 50 and 51, extend from the supply battery BA-1 and pass through insulating bushings 52 mounted in suitable holes in the bottom plate 11. The conductor 50 is connected to one side of the capacitor C and by a strap 53 to a conductor 54 which passes outwardly through a suitable hole in the bottom plate 11 and is secured, as by soldering, to the lug on the connector member 45 adjacent the fixed contact member 42 for the driving vibrator 28. A conductor 55 is connected, again, as by soldering, to the connector member 33 adjacent the driving vibrator 28 and this conductor extends through a suitable hole in the bottom plate 11 to the other side of the capacitor C. Another conductor 56 is connected to the junction of the conductor 55 and the capacitor C and to one side of the winding of the upper electromagnet 21; a conductor 57 connects the other side of the winding of the upper electromagnet 21 to one side of the lower electromagnet 21; and a conductor 58 connects the other side of the lower electromagnet 21 to the conductor 51. A conductor 59 is connected, as by soldering, to the lug of the connector member 33 adjacent the output vibrator 29; similarly, a conductor 60 is connected to the lug of the connector member 45, again as by soldering, adjacent the fixed contact member 42 for the output vibrator 29. The conductors 59 and 60 pass outwardly of the casing through a suitable hole in the bottom plate 11.

The capacitor C substantially eliminates sparking at the contacts 30—44 of the driving vibrator 28 and consequent erosion of these contacts. No capacitor is necessary across the contacts 30—44 of the output vibrator 29 as the potential across these contacts received from the search coil SC, Fig. 6, is only a few microvolts and the current in the output circuit only a few microamperes. In addition the capacitor C performs another function as will appear hereinafter.

Fig. 6 shows an example of an application of the self-excited chopper to a mine. The output vibrator 29 is connected to a magnetically responsive search coil SC which in turn is connected to one input terminal of an amplifier AP; the fixed contact member 44 for the output vibrator 29 is connected to the other terminal of the amplifier. A battery BA-2 is connected to the amplifier by conductors 61 and 62 and supplies the filament current for the vacuum tubes of the amplifier; similarly, a battery BA-3 is connected to the amplifier by conductors 62 and 63 and supplies the plate current for the vacuum tubes. The output of the amplifier is connected by a pair of conductors 64 to a detonator D.

The operation of the self-driven chopper will be obvious from the preceding description. It may, however, be briefly summarized as follows: As the electromagnets 21—21 are energized by the battery BA-1, the driving vibrator 28 and its armature 31 are drawn toward the electromagnets, a small amount of electrical energy being required by reason of the high impedance of the magnets. On the inward stroke of the vibrator 28 the contact 30 carried thereby will be separated from the fixed contact 44 and the circuit through the electromagnets 21—21 will be broken. The vibrator 28 and the armature 31 carried thereby will then return to normal position due to the inherent resiliency of the vibrator. In such position the movable contact 30 carried by the armature will again engage the fixed contact 44 and the cycle will be repeated. The frequency of oscillation of the vibrator 28 and the armature 31 carried thereby can be controlled to a slight extent by adjusting the set screw 41 which operates on the spring member 35 to determine the position of the fixed contact 44.

At the same time that the driving vibrator 28 is attracted by the electromagnets 21—21 the driven or output vibrator 29 and its armature 31 are likewise attracted on a common magnetic circuit. On the inward stroke of the output vibrator, the output circuit is interrupted at contacts 30—44 of the output vibrator. When the circuit through the electromagnets 21—21 is broken, as above described, the flux set up by the magnets 21—21 decays and the output vibrator 29 and the armature 31 carried thereby will be returned to initial position by the inherent resiliency of the output vibrator. The output circuit will now be re-closed as the contact 30 carried by the output vibrator engages the associated fixed contact 44.

Assume now, by way of example, that the self-driven chopper is incorporated in a mine. A vessel approaching the mine will have a magnetic field which will traverse the search coil SC and a small electromotive force will be induced in this coil due to the relative motion of the magnetic field with respect to the turns of winding of the search coil and this electromotive force will send a current through the repeatedly interrupted circuit comprising the search coil, output contacts 30—44 of the chopper, and the amplifier AP. In the absence of such interruption, this current will be small as the electromotive force induced in the search coil SC will be small, and of insufficient strength to operate the detonator D even though increased by the amplifier AP. However, the output vibrator 29 will chop up the otherwise slowly changing current into a series of pulsating signals which are adapted to be amplified by the amplifier AP sufficiently to operate the detonator D.

It is well known that an undamped spark at a pair of contacts gives off high frequency electromagnetic radiation and the search coil SC being comprised by a large number of turns of very fine wire wound around a core of high permeability, such as the alloy known commercially as "Permalloy," and of necessity arranged in close proximity to the spark gap it is possible that such electromagnetic radiation from the contacts 30—44 of the driving vibrator 28 would induce in the search coil an electromotive force sufficient to cause the detonator D to operate while no vessel was in the vicinity of the mine. Since, however, the spark discharge across the contacts 30—44 of the driving vibrator 28 is substantially damped out by the capacitor C, as hereinbefore stated, there is no possibility of prematurely firing the mine or torpedo from this cause.

It is well known that the presence of electromagnetic devices, such as the instant chopper, in a magnetic influence mine or torpedo having a search coil, in the operation thereof produce stray magnetic fields which interlink with the search coil and cause the latter to produce false or spurious signals which likewise may fire the mine or torpedo prematurely. Such a condition is avoided in the instant case by the provision of the magnetic shielding for the chopper, as previously described, which prevents the magnetic field set up by the chopper from interlinking with the search coil.

While there is shown and described herein a certain preferred embodiment of the invention, many other and varied forms and uses will present themselves to those versed in the art, after understanding the invention, without departing from the spirit of the invention, and the invention, therefore, is not limited either in structure or in use except as indicated by the terms and scope of the appended claims.

The invention herein described and claimed may be manufactured and used by or for the Government of the United States of America for governmental purposes without the payment of any royalties thereon or therefor.

What is claimed as new and desired to be secured by Letters Patent of the United States is:

1. In a self-driven chopper of the character disclosed for periodically interrupting a slowly varying current, the combination of a pair of vibrating elements having armatures individual thereto and disposed in predetermined spaced relation relative to each other, an electromagnet disposed between said armatures so as to form a common magnetic circuit therewith, a pair of interrupter switches individual to said vibrating elements and adapted to be actuated thereby as the electromagnets operate, a source of potential a driving circuit including said source of potential and one of said pair of interrupter switches for operating the electromagnets on self-generated pulses, a chopping circuit including the other of said pair of interrupting switches for converting the slowly varying current to current impulses, and shield means interposed between the vibrating elements for preventing electrostatic coupling between said switches as the switches operate.

2. In a self-driven chopper of the character disclosed, the combination of a pair of vibrating elements having armatures individual thereto and disposed in predetermined spaced relation relative to each other, a pair of electromagnets disposed between said armatures so as to form a common magnetic circuit therewith, a first non-magnetic member for supporting one of said vibrating elements and the electromagnets and disposed therebetween, a second non-magnetic member for supporting the other vibrating element and the electromagnets and disposed therebetween, a pair of interrupter switches individual to said vibrating elements, and a driving circuit including one of said pair of interrupter switches for operating the electromagnets on self-generated pulses, said first and second supporting members also serving as shields for preventing electrostatic coupling between said switches as the switches operate.

3. In a self-driven chopper of the character disclosed for periodically interrupting a slowly varying current, the combination of first and second vibrating elements having armatures individual thereto and disposed in predetermined spaced relation with respect to each other, a pair of electromagnets disposed between said armatures so as to form a common magnetic circuit therewith, first and second pairs of interrupter contacts individual to said first and second vibrating elements and adapted to be actuated thereby as the electromagnets operate, a source of potential, a driving circuit including said source of potential and the first of said pairs of interrupter contacts for operating the electromagnets on self-generated pulses, a condenser connected between the contacts of said first pair of interrupter contacts for suppressing sparking thereof as the contacts operate, a current source, a chopping circuit including said current source and the second of said pairs of interrupter contacts for intermittedly interrupting said current, and shield means interposed between the vibrating elements for preventing electrostatic coupling between said pairs of contacts in response to sparking of said first pair of contacts.

4. In a self-driven chopper of the character disclosed, the combination of a pair of vibrating elements having armatures individual thereto and disposed in predetermined spaced relation relative to each other, a pair of electromagnets disposed between said armatures so as to form a common magnetic circuit therewith, a pair of interrupter switches individual to said vibrating elements and adapted to be actuated thereby as the electromagnets operate, a driving circuit including one of said pairs of interrupter switches for operating the electromagnets on self-generated pulses, a pick-up coil for generating low frequency currents in response to changes in the strength of an external magnetic field within the vicinity thereof, a chopping circuit including said pick-up coil and the other of said interrupter switches for converting said low frequency currents to current impulses as said other interrupter switch operates, shield means for preventing electrostatic coupling between said driving and chopping circuits as the interrupter switches operate, and shield means for preventing magnetic coupling between said pick-up coil and the electromagnets as the electromagnets operate.

5. In a firing control system of the character disclosed, the combination of means adapted to generate low frequency currents in response to changes in the strength of an external magnetic field within the vicinity thereof, a self-driven electromagnet chopper having a pair of interrupter switches, a driving circuit including one of said switches for operating the chopper on self-generated pulses, a chopper circuit including said low frequency generating means and the other of said interrupter switches for converting said low frequency currents to current impulses as said other interrupter switch operates, a firing circuit, and means responsive to said current impulses for operating said firing circuit when the changes in the strength of said field reach a predetermined value.

6. In a firing control system of the character disclosed, the combination of means adapted to generate low frequency currents in response to changes in the strength of an external magnetic field within the vicinity thereof, a self-driven electromagnet chopper having a pair of interrupter switches, a driving circuit including one of said switches for operating the chopper on self-generated pulses, a chopper circuit including said low frequency generating means and the other of said interrupter switches for converting said low frequency currents to current impulses as said other interrupter switch operates, a firing circuit, means responsive to said current impulses for operating said firing circuit when the changes in the strength of said field reach a predetermined value, means for preventing magnetic coupling between the chopper and said field responsive means as the chopper operates, and means for preventing electrostatic coupling between said driving and chopping circuits as the interrupter switches operate.

References Cited in the file of this patent
UNITED STATES PATENTS

| | | |
|---|---|---|
| 1,382,374 | Maxim | June 21, 1921 |
| 1,466,915 | Nichols | Sept. 4, 1923 |
| 1,854,863 | Roe | Apr. 19, 1932 |
| 2,113,762 | James | Apr. 12, 1938 |
| 2,168,198 | Frink | Aug. 1, 1939 |
| 2,206,446 | Bereskin | July 2, 1940 |
| 2,476,931 | Tubbs | July 19, 1949 |